(12) United States Patent
Takeuchi

(10) Patent No.: US 8,390,277 B2
(45) Date of Patent: Mar. 5, 2013

(54) ROTATIONAL ANGLE DETECTOR

(75) Inventor: Shuichi Takeuchi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 259 days.

(21) Appl. No.: 12/908,591

(22) Filed: Oct. 20, 2010

(65) Prior Publication Data

US 2011/0095658 A1   Apr. 28, 2011

(30) Foreign Application Priority Data

Oct. 22, 2009   (JP) .................. 2009-243775

(51) Int. Cl.
   *G01B 7/30*   (2006.01)
(52) U.S. Cl. ................................ 324/207.25
(58) Field of Classification Search .............. 324/207.25
   See application file for complete search history.

(56) References Cited

U.S. PATENT DOCUMENTS

2006/0243519 A1   11/2006   Staudenmann et al.
2007/0075672 A1   4/2007   McClelland

FOREIGN PATENT DOCUMENTS

| CN | 1945960 A | 4/2007 |
|---|---|---|
| CN | 201018440 Y | 2/2008 |
| JP | 2002-310609 | 10/2002 |
| JP | 2004-328832 A | 11/2004 |
| JP | 2005-121612 A | 5/2005 |
| JP | 2006-10366 | 1/2006 |
| WO | WO 2004/102123 A1 | 11/2004 |

*Primary Examiner* — Reena Aurora
(74) *Attorney, Agent, or Firm* — Patterson Thuente Christensen Pedersen, P.A.

(57) ABSTRACT

A rotational angle detector provided with a circular rotary plate integrally rotatable with a rotor of a motor and including a circumferential surface having marks, which are spaced apart by different angular intervals in a circumferential direction. A rotational angle detection unit is arranged along the circumferential direction of the rotary plate to detect a rotational angle of each mark, rotated together with the rotary plate, in a predetermined detection zone. The rotational angle detector determines, when adjacent marks are located in the detection zone, angular intervals between the adjacent marks based on the rotational angle of each mark, specifies a mark that is located in the detection zone based on the determined angular intervals, and detects the rotational angle of the rotor based on the rotational angle of the specified mark rotating in the detection zone.

8 Claims, 7 Drawing Sheets

ϕ=0°

Detected Notches: D4, D1
↓
Rotational Angle
Correction Value α=「0°」

0°<ϕ<24°

Detected Notch: D4
↓
Rotational Angle
Correction Value α=「0°」

24°≦ϕ<36°

Detected Notches: D3, D4
↓
Rotational Angle
Correction Value α=「24°」

36°≦ϕ<42°

Detected Notches: D2, D3, D4
↓
Shortest Angular
Interval of Notches:「12°」
↓
Rotational Angle
Correction Value α=「36°」

42° ≤ ⌀ < 84°

Detected Notches: D1, D2, D3
↓
Shortest Angular
Interval of Notches: 「6°」
↓
Rotational Angle
Correction Value α=「42°」

84° ≤ ⌀ < 90°

Detected Notch: D1
↓
Rotational Angle
Correction Value α=「42°」

ROTATIONAL ANGLE DETECTOR

CROSS-REFERENCE TO RELATED APPLICATIONS

This application is based upon and claims the benefit of priority from prior Japanese Patent Application No. 2009-243775, filed on Oct. 22, 2009, the entire contents of which are incorporated herein by reference.

BACKGROUND OF THE INVENTION

The present invention relates to a rotational angle detector, and more particularly, to a rotational angle detector used to detect the rotational angle of a rotor in a motor.

Power steering systems and air conditioners installed in, for example, automobiles are often driven by brushless motors. A typical brushless motor includes a rotor, which is formed by a permanent magnet, and a stator, which is formed by coils that are energized by the rotor. Electromagnetic force, which is in accordance with the power supplied to the stator, acts on the rotor. This rotates a rotary shaft of the motor. The brushless motor normally includes a rotational angle detector that detects the rotational angle of the rotor. The power supplied to the stator is controlled in accordance with the rotational angle of the rotor that is detected by the rotational angle detector. This controls the rotational state of the rotary shaft in the motor.

Japanese Laid-Open Patent Publication No. 2002-310609 describes a rotational angle detector that detects the rotational angle of a rotor. FIG. 1 is a perspective view showing the rotational angle detector. As shown in FIG. 1, the rotational angle detector includes a rotary plate 51, a magnet 52, and a magnetic sensor 53. The rotary plate 51 is rotated integrally with a rotary shaft 50 of a motor. The magnet 52 is spaced apart by a predetermined distance from the circumferential surface of the rotary plate 51. The magnetic sensor 53 is arranged between the circumferential surface of the rotor and the magnet 52. The rotary plate 51, which has an outer diameter that gradually increases in the circumferential direction, is formed from a magnetic material. The rotary shaft 50 of the motor is also formed from the same magnetic material. The magnet 52 includes a surface facing toward the rotary plate 51 and a surface facing away from the rotary plate 51. A J-shaped yoke 54 is arranged on the surface of the magnet 52 that faces away from the rotary plate 51. The yoke 54 guides the magnetic force generated by the magnet 52 toward one end of the rotary shaft 50. The yoke 54, the rotary shaft 50, and the rotary plate 51 form a magnetic circuit. The magnetic circuit forms a magnetic field in the clearance between the magnet 52 and the circumferential surface of the rotary plate 51. The magnetic sensor 53 outputs a voltage signal that is in accordance with the magnetic field.

In the rotational angle detector, rotation of the motor rotary shaft 50 rotates the rotary plate 51. This varies the size of the clearance between the circumferential surface of the rotary plate 51 and the magnet 52 and changes the magnetic field acting on the magnetic sensor 53. In other words, rotation of the motor rotary shaft 50 varies the output signal of the magnetic sensor 53. The output signal of the magnetic sensor 53 varies linearly relative to changes in the rotational angle of the rotary shaft 50. Accordingly, the rotational angle of the rotary shaft 50, or rotor, may be calculated from the output signal of the magnetic sensor 53. This would allow for the rotational angle of the rotor to be detected with high accuracy.

In the rotational angle detector described in the above publication, a cross-section of the rotary plate 51 taken along a plane extending perpendicularly to the motor rotary shaft 50 has a noncircular shape. Thus, the rotary plate 51 is rotated in an eccentric state when the rotary shaft 50 rotates. This may vibrate the rotary plate 51 and lower the detection accuracy of the rotational angle of the rotor.

SUMMARY OF THE INVENTION

The present invention provides a rotational angle detector that detects the rotational angle of a rotor with high accuracy.

One aspect of the present invention is a rotational angle detector for detecting a rotational angle of a rotor arranged in a motor. The rotational angle detector includes a circular rotary plate integrally rotatable with the rotor and including a circumferential surface having a plurality of marks spaced apart from one another by different angular intervals in a circumferential direction. A rotational angle detection unit is arranged along the circumferential direction of the rotary plate to detect a rotational angle of each of the plurality of marks, which are rotated together with the rotary plate, in a predetermined detection zone. The rotational angle detector determines, when adjacent ones of the plurality of marks are located in the detection zone, angular intervals between the adjacent ones of the marks based on the rotational angle of each mark detected by the rotational angle detection unit, specifies from the plurality of marks a mark that is located in the detection zone based on the determined angular intervals, and detects the rotational angle of the rotor based on the rotational angle of the specified mark rotating in the detection zone.

A further aspect of the present invention is a method for detecting a rotational angle of a rotor arranged in a motor. The method includes detecting a rotational angle of each of a plurality of marks, which are formed on a circular rotary plate, in a predetermined detection zone, the rotary plate being integrally rotatable with the rotor, and the plurality of marks being spaced apart from one another by different angular intervals in a circumferential direction of the rotary plate. The method further includes determining, when adjacent ones of the plurality of marks are located in the detection zone, angular intervals between the adjacent ones of the marks based on the rotational angle of each mark, specifying from the plurality of marks a mark that is located in the detection zone based on the determined angular intervals, and detecting the rotational angle of the rotor based on the rotational angle of the specified mark rotating in the detection zone.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
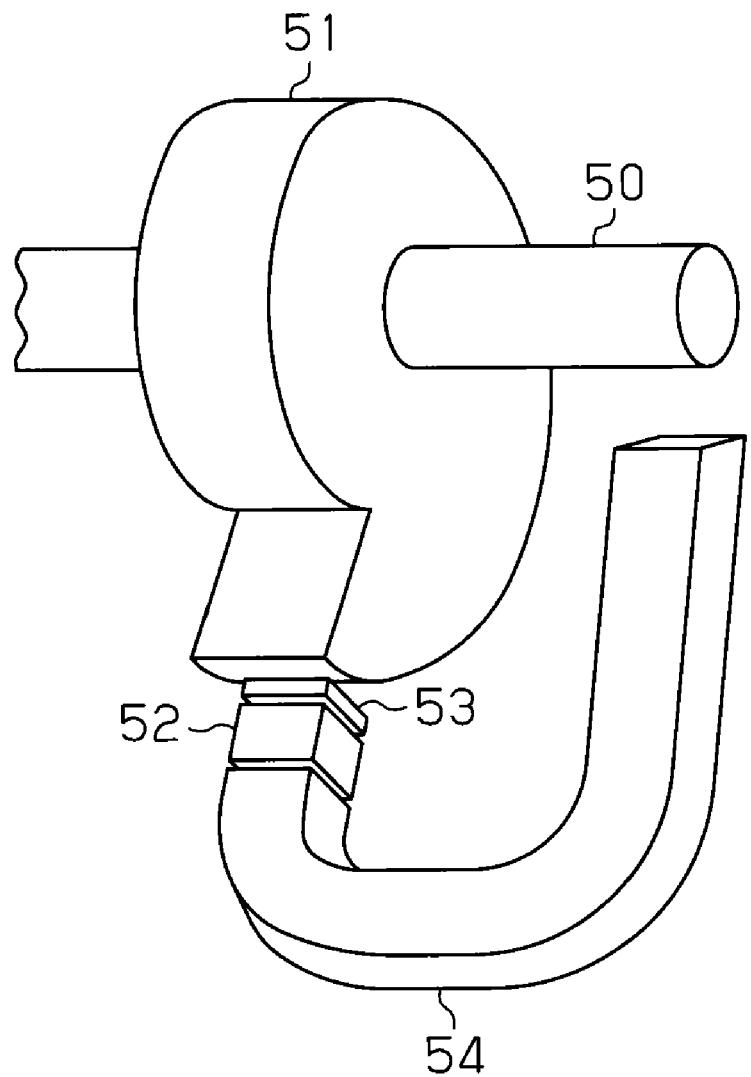
FIG. 1 is a perspective view showing a rotational angle detector of the prior art.
Figure 2:
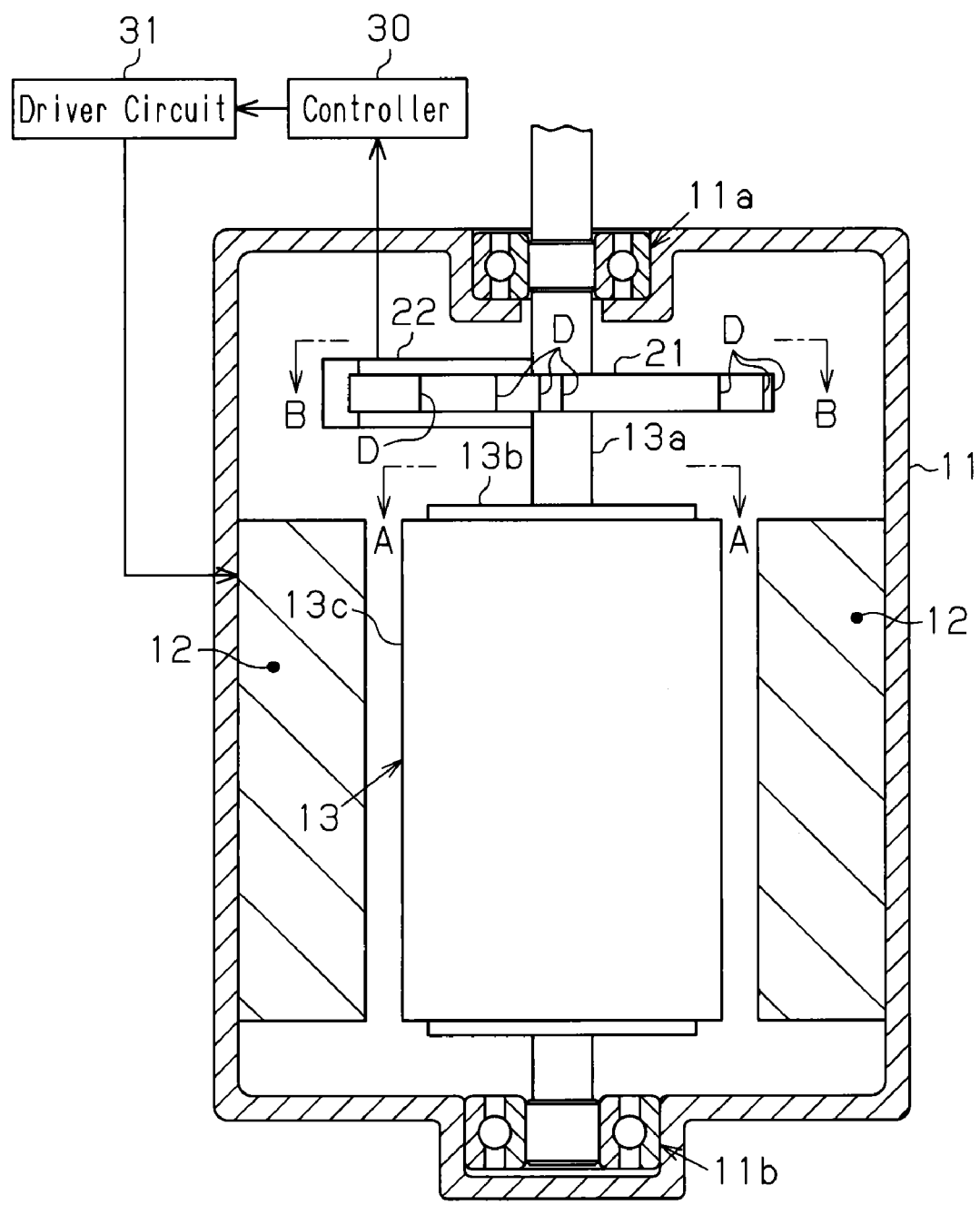
FIG. 2 is a partial cross-sectional view schematically showing a brushless motor including a rotational angle detector according to one embodiment of the present invention.
Figure 3:
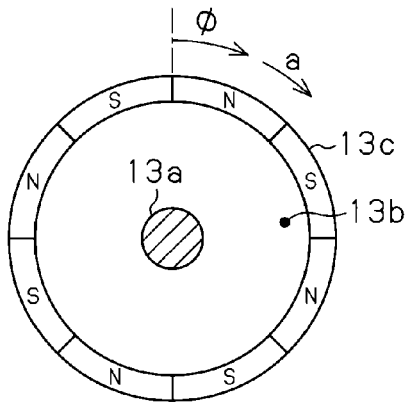
FIG. 3 is a cross-sectional view taken along line A-A in FIG. 2.

A rotational angle detector according to one embodiment of the present invention will now be discussed with reference to FIGS. 2 to 10. FIG. 2 is a partial cross-sectional view schematically showing a brushless motor that includes the rotational angle detector of the present embodiment. FIG. 3 is a cross-sectional diagram taken along line A-A in FIG. 2. The structure of the brushless motor will now be described with reference to FIGS. 2 and 3.

Referring to FIG. 2, the brushless motor includes a hollow housing 11, a stator 12, and a rotor 13. The stator 12 is fixed to the inner wall of the housing 11. The rotor 13 is arranged in a radially inward side of the stator 12. The rotor 13 includes a rotary shaft 13*a*, a motor core 13*b*, and a ring magnet 13*c*. The rotary shaft 13*a* is rotatably supported by bearings 11*a* and 11*b* in the housing 11. The motor core 13*b* is cylindrical and rotates integrally with the rotary shaft 13*a*. The ring magnet 13*c* is annular and fitted onto the motor core 13*b*. As shown in FIG. 3, the ring magnet 13*c* is alternately magnetized to N poles and S poles in angular intervals of 45° in the circumferential direction. Thus, eight magnetic poles are set for the rotor 13. In the brushless motor, the stator 12 is energized to form a magnetic field with the ring magnet 13*c*. This generates electromagnetic force that acts on the ring magnet 13*c* thereby rotating the rotor 13 about the rotary shaft 13*a*. The torque produced by the rotor 13 in this state is transmitted by the rotary shaft 13*a* to an external device. As shown in FIG. 3, the rotor 13 is rotated in the direction indicated by the arrow a.

Figure 4:
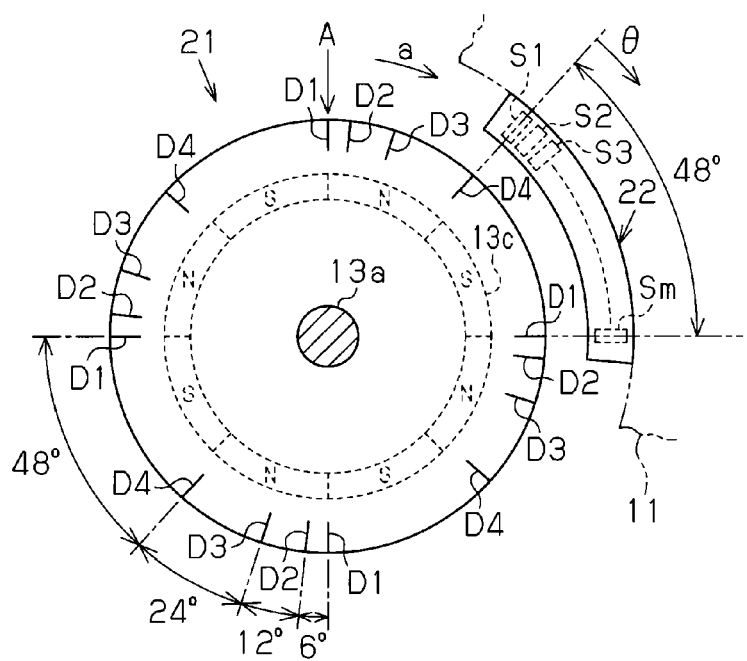
FIG. 4 is a cross-sectional view taken along line B-B in FIG. 2.

As shown in FIG. 2, a rotary plate 21, which is circular and rotated integrally with the rotary shaft 13*a*, is coupled to the rotary shaft 13*a* at a position located closer to the bearing 11*a* than the motor core 13*b*. The rotary plate 21 is formed from a conductive material such as metal and has a circumferential surface that includes a plurality of notches D spaced apart from one another at different angular intervals in the circumferential direction. The notches D each function as a mark used to detect the rotational position of the rotary plate 21 and is formed, for example, as a recess. FIG. 2 shows the notches D (shown as notches D1 to D4 in FIGS. 4 and 5) in a simplified manner using lines. As shown in FIGS. 2 and 4, the housing 11 has an inner wall surface facing toward the circumferential surface of the rotary plate 21. A rotation sensor 22, which serves as a rotational angle detection unit, is fixed to the inner wall surface of the housing 11 spaced apart by a predetermined clearance from the circumferential surface of the rotary plate 21. The rotation sensor 22 detects the rotational angles of the notches D formed in the circumferential surface of the rotary plate 21. In the brushless motor, the rotation sensor 22 sends output signals to a controller 30, which includes a microcomputer. The controller 30 detects the rotational angles of the notches D based on the output signals of the rotation sensor 22. Further, the controller 30 detects the rotational angle of the rotor 13, or magnetic pole position of the rotor 13. As mentioned above, the rotor 13 includes eight magnetic poles (FIG. 3). Thus, when the rotor 13 rotates, the magnetic pole positions change in cycles of 90°. In the present embodiment, the magnetic pole position of the rotor 13 shown in the state of FIG. 3 is set as a rotational reference position of the rotor 13. A rotational angle $\phi$ from the rotational reference position is expressed in the range of $0° \leq \phi \leq 90°$. Referring to FIG. 2, the controller 30 controls the rotation of the rotor 13 by controlling the power supplied from a driver circuit 31 to the stator 12 based on the rotational angle of the rotor 13 detected by the rotation sensor 22. In this manner, in the present embodiment, the rotary plate 21, the rotation sensor 22, and the controller 30 form the rotational angle detector that detects the rotational angle $\phi$ of the rotor 13.

Figure 5:
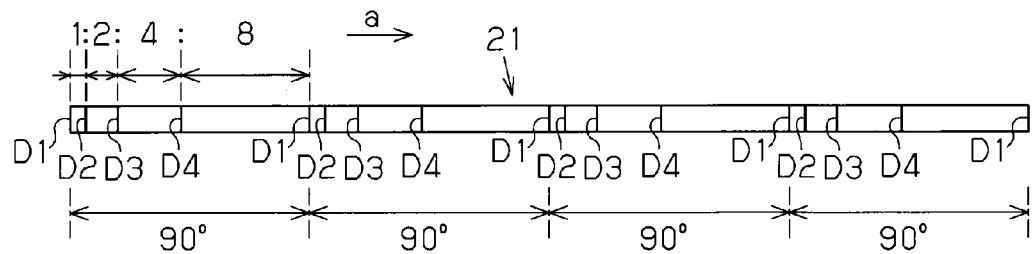
FIG. 5 is a developed view showing the circumferential surface of a rotary plate arranged in the rotational angle detector of FIG. 2 in a linearly laid out state.

The structure of the rotary plate 21 and the rotary sensor 22 will now be described in detail with reference to FIGS. 4 and 5. FIG. 4 is a cross-sectional view taken along line B-B in FIG. 2, and FIG. 5 is a developed view that linearly lays out the circumferential surface of the rotary plate 21 from point A shown in FIG. 4 in the direction indicated by the arrow a.

Referring to FIG. 4, the circumferential surface of the rotary plate 21 includes a total of sixteen notches D, divided into four sets of notches D1 to D4 as described below in paragraphs (a1) to (a4).

(a1) Notches D1 are formed at positions corresponding to angles at which the magnetic poles of the rotor 13 switch from an S pole to an N pole in the direction indicated by the arrow a.

(a2) Notches D2 are formed at positions shifted by 6° in the direction indicated by the arrow a from the notches D1.

(a3) Notches D3 are formed at positions shifted by 12° in the direction indicated by the arrow a from the notches D2.

(a4) Notches D4 are formed at positions shifted by 24° in the direction indicated by the arrow a from the notches D3.

As shown in FIG. 5, the notches D1 to D4 form a layout pattern (mark pattern) serving as a reference pattern. In the present embodiment, the layout pattern is formed so that the angular intervals between two adjacent notches in the direction indicated by the arrow a vary at a ratio of 1:2:4:8. The circumferential surface of the rotary plate 21 includes four layout patterns, which have the same reference pattern, arranged at angular intervals of 90° in the circumferential direction. In this manner, a plurality of (four in this case) layout patterns corresponding to one half the number of magnetic poles (eight in this case) of the rotor 13 are arranged on the circumferential surface of the rotary plate 21. That is, a set of the notches D1 to D4 are arranged in an angular zone that includes a pair of magnetic poles (N pole and S pole) of the rotor 13.

Referring to FIG. 4, the rotation sensor 22 performs the so-called eddy current flaw detection to detect the approach of a notch D and includes an array of a plurality of eddy current flaw sensors S1 to Sm. The sensors S1 to Sm are arranged in an arced manner along the circumferential surface of the rotary plate 21. Here, m is an integer of "2" or greater. The rotation sensor 22 has a detection zone that conforms to the zone in which the sensors S1 to Sm are arranged. The sensors S1 to Sm each provide the controller 30 with a voltage signal corresponding to the rotational positions of the notches D located in the detection area. The rotation sensor 22 has a capacity for detecting the longest angular interval between two adjacent ones of the notches D, or notches D1 to D4. In the present embodiment, the detection zone of the sensor 22 is set to include the same range as the longest angular interval, namely, a range of 48°, which is the angular interval between the notches D1 and D4. This allows for the rotation sensor 22 to be reduced in size while ensuring that it has the necessary detection function.

Figure 6:
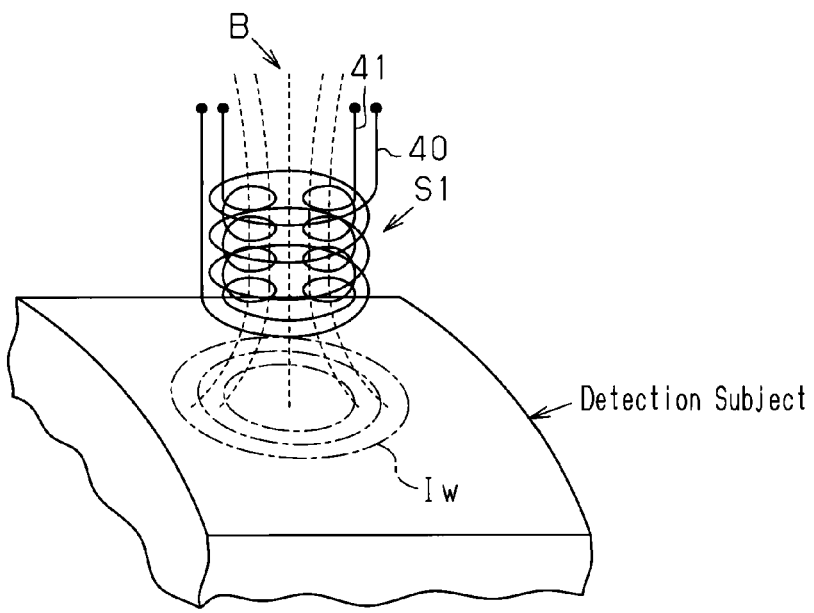
FIG. 6 is a schematic perspective view showing an eddy current flaw sensor arranged in the rotational angle detector of FIG. 2.

Referring to FIGS. 6 and 7, the structure and detection principle of the eddy current flaw sensors S1 to Sm will now be discussed. The eddy current flaw sensors S1 to Sm have the same structure. Thus, only the eddy current flaw sensor S1 will be described.

As shown in FIG. 6, the eddy current flaw sensor S1 includes an excitation coil 40. AC current having a constant frequency flows through the excitation coil 40. The AC current causes the excitation coil 40 to induce an alternative magnetic field B that acts on a detection subject (in this example, the rotary plate 21). This generates eddy current Iw at the circumferential surface of the detection subject. The eddy current flaw sensor S1 also includes a detection coil 41, which induces AC voltage in correspondence with the magnetic field induced by the eddy current Iw and the alternating magnetic field B induced by the excitation coil 40.

In the eddy current flaw sensor S1, the alternating magnetic field B induced by the excitation coil 40 is always sustained in a constant state. Thus, when a flaw such as a notch D is not present immediately below the sensor S1, the flow of the eddy current Iw is sustained in a constant state. In this case, the AC voltage induced by the detection coil 41 is sustained in a constant state. When a flaw such as a notch D is present immediately below the sensor, a change occurs in the flow of the eddy current Iw. A change also occurs in the magnetic field induced by the eddy current Iw. In this case, a change occurs in the AC voltage induced by the detection coil 41. In this manner, the eddy current flaw sensor S1 detects a change in the AC voltage induced by the detection coil 41 to detect the approach of a notch D.

Figure 7A:
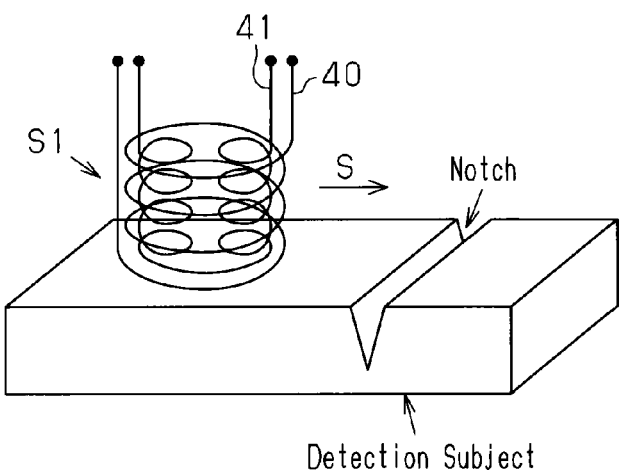
FIG. 7A is a schematic view showing an operational example of the eddy current flaw sensor of FIG. 6.
Figure 7B:
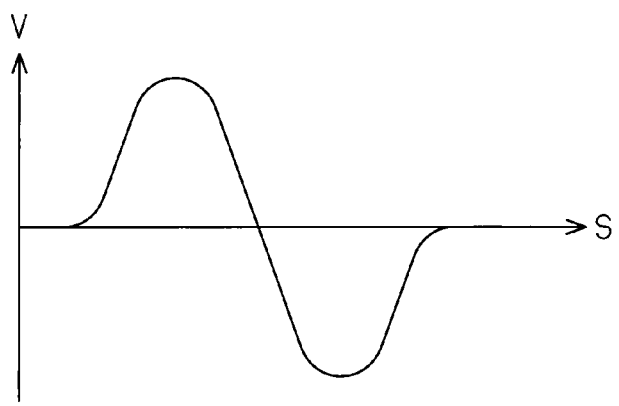
FIG. 7B is a waveform chart showing an output signal of the eddy current flaw sensor generated when a crack in the tested subject of FIG. 7A is detected.

In this example, the eddy current flaw sensors S1 to Sm each incorporate a signal processing circuit (not shown) for signal-processing the voltage signals output from the detection coil 41. Further, the sensors S1 to Sm each extract only changes in the AC voltage induced by the detection coil 41 and sends a corresponding signal to the controller 30. More specifically, when the sensor S1 scans the surface of the detection subject in the direction indicated by the arrow S as shown in FIG. 7A and a notch becomes located immediately below the sensor S1, the sensor S1 provides the controller 30 with a signal having a waveform as shown in FIG. 7B.

The use of such eddy current flaw sensors S1 to Sm only require the notches D to be arranged in the circumferential surface of the rotary plate 21. This facilitates the machining of the rotary plate 21 in comparison to, for example, when using proximity sensors that detect projections arranged on the circumferential surface of the rotary plate 21.

The controller 30 monitors the waveform of the voltage signal output from each of the sensors S1 to Sm to detect the approach of any one of the notches D in the detection zone. Based on the detection result, the controller 30 determines, or detects, the rotational angle (rotational position) $\theta$ of a notch D in the detection zone. In this example, referring to FIG. 4, in a state in which one of the notches D is proximal to the eddy current flaw sensor S1, the position of the notch D is set as a rotational angle reference position. The rotational angle $\theta$ of the notch D from the rotational angle reference position is set in a range from $0° \leq \theta \leq 48°$. For example, when the notches D4 and D1 respectively face toward the eddy current flaw sensors S1 and Sm as shown in FIG. 4, the controller 30 detects the rotational angle of the notch D4 in the detection zone as being 0° and detects the rotational angle of the notch D1 in the detection zone as being 48°.

As described above, the notches D1 to D4 are spaced apart from one another at different angular intervals in the circumferential direction of the rotary plate 21. Thus, the ones of the notches D1 to D4 located in the detection zone of the rotation sensor 22 may be specified by obtaining the angular intervals of the adjacent ones of the notches D in the detection zone. Further, the rotational angle of the rotary plate 21 may be obtained directly from the rotational angles of the notches D1 to D4. Thus, by specifying the notches D located in the detection zone, the rotational angle of the rotary plate 21, or the rotary angle $\phi$ of the rotor 13, may be detected based on the rotational angles $\theta$ of the specified notches D.

Figure 8:
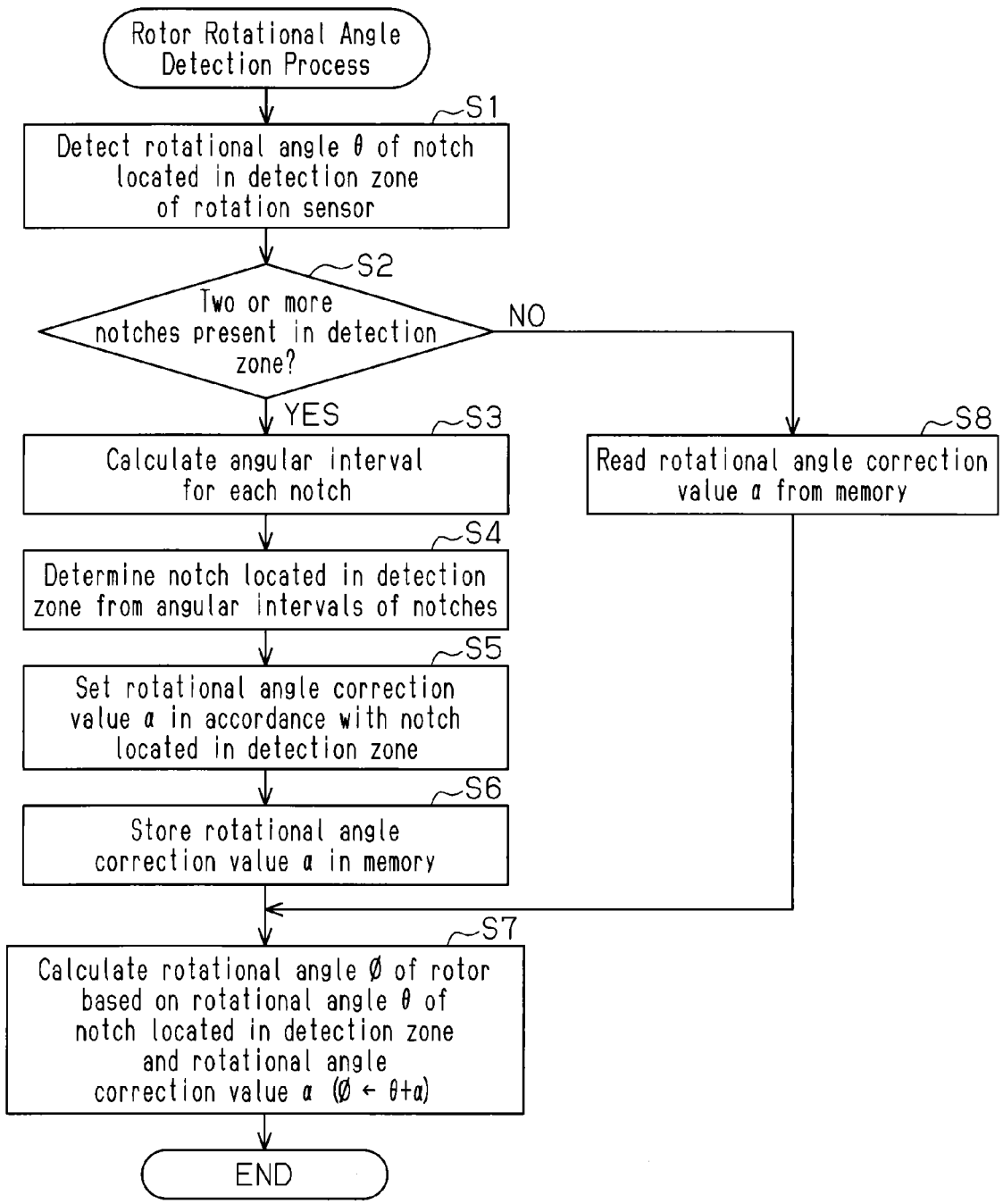
FIG. 8 is a schematic flowchart showing the procedures of a rotor rotational angle detection process performed by the rotational angle detector of FIG. 2.

FIG. 8 is a flowchart showing the procedures for a rotor rotational angle detection process performed by the controller 30 to detect the rotary angle $\phi$ of the rotor 13 based on the rotational angles $\theta$ of the notches D located in the detection zone. The process shown in FIG. 8 is performed repeatedly in predetermined computation cycles.

As shown in FIG. 8, the controller 30 first detects the rotational angle $\theta$ of a notch D that is located in the detection zone based on an output signal from the rotation sensor (step S1). Then, the controller 30 determines whether or not two or more notches D are present in the detection zone based on the detected rotational angle $\theta$ (step S2). When two or more notches D are present in the detection zone (step S2: YES), the controller 30 calculates the angular interval between two notches D that are adjacent to each other in the direction indicated by the arrow a based on the rotational angle $\theta$ of the notch D detected in step S1 (step S3). Then, the controller 30 specifies the notches D located in the detection zone based on the calculated angular interval (step S4). More specifically, based on the shortest angular interval calculated in step S3, the controller 30 determines which one of the notches D1 to D4 is the notch D that is located in the detection zone and has the shortest angular angle. This determination is performed as described below in paragraphs (b1) to (b4).

(b1) When the calculated shortest angular interval is 6°, the notch D that has the minimum rotational angle in the detection zone is D1.

(b2) When the calculated shortest angular interval is 12°, the notch D that has the minimum rotational angle in the detection zone is D2.

(b3) When the calculated shortest angular interval is 24°, the notch D that has the minimum rotational angle in the detection zone is D3.

(b4) When the calculated shortest angular interval is 48°, the notch D that has the minimum rotational angle in the detection zone is D4.

After step S4, the controller 30 sets a rotational angle correction value a in accordance with which one of the notches D1 to D4 is the notch D that has the minimum rotational angle in the detection zone (step S5). The rotational angle correction value $\alpha$ is set as described below in paragraphs (c1) to (c4).

(c1) When the notch D that has the minimum rotational angle in the detection zone is D1, the rotational angle correction value $\alpha$ is set to 42°.

(c2) When the notch D that has the minimum rotational angle in the detection zone is D2, the rotational angle correction value α is set to 36°.

(c3) When the notch D that has the minimum rotational angle in the detection zone is D3, the rotational angle correction value α is set to 24°.

(c4) When the notch D that has the minimum rotational angle in the detection zone is D4, the rotational angle correction value α is set to 0°.

After step S5, the controller 30 stores the rotational angle correction value α in a memory, which is incorporated in the controller 30 (step S6). Then, the controller 30 calculates the rotational angle φ of the rotor 13 based on the rotational angle θ of the notch D in the detection zone and the rotational angle correction value α (step S7). In this example, the rotational angle correction value α is added to the rotational angle θ of the notch D that has the minimum rotational angle in the detection zone to calculate the rotational angle φ of the rotor 13.

In step S2, when two or more notches D are not present in the detection zone of the rotation sensor 22 (step S2: NO), that is, when only one notch D is present in the detection zone, the controller 30 reads the stored rotational angle correction value α from the memory (step S8). Then, the rotational angle correction value α is added to the rotational angle θ of the single notch D detected in step S1 to calculate the rotational angle φ of the rotor 13 (step S7).

Referring to FIGS. 9 and 10, examples in which the rotational angle φ of the rotor 13 is calculated through the rotor rotational angle detection process will now be described. FIGS. 9 and 10 correspond to FIG. 4 and are cross-sectional views taken along line B-B in FIG. 10. The notches located outside the detection zone of the rotation sensor 22 are shown by broken lines to facilitate understanding in FIGS. 9 and 10.

Figure 9A:
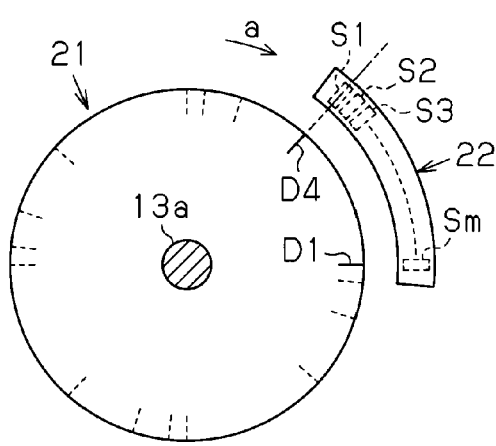
FIGS. 9A to 9D are schematic cross-sectional views showing examples of the rotor rotational angle calculated through the rotational angle detection process of FIG. 8.

As shown in FIG. 9A, for example, when the rotational angle φ of the rotor 13 is 0°, the notches D4 and D1 are arranged in the detection zone of the rotation sensor 22. Since the angular interval between the notches D4 and D1 is 48°, the controller 30 sets the rotational angle correction value α to 0°. Then, the controller 30 adds the rotational angle correction value α to a rotational angle θ4 of the notch D4 to calculate the rotational angle φ of the rotor 13. In this case, the rotational angle θ4 of the notch D4 in the detection zone is 0°. Thus, the rotational angle φ of the rotor 13 is 0°.

Figure 9B:
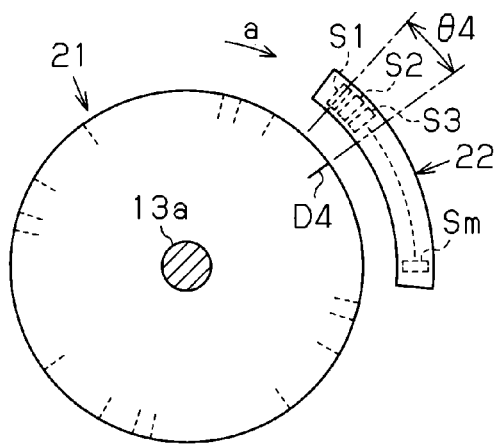

Subsequently, as the rotor 13 rotates in the direction indicated by the arrow a, the rotational angle φ of the rotor 13 changes in the range of 0°<φ<24°. As a result, only the notch D4 becomes included in the detection zone of the rotation sensor 22 as shown in FIG. 9B. In this state, the controller 30 reads the rotational angle correction value α (0°) from the incorporated memory and adds the rotational angle correction value α to the rotational angle θ4 of the notch D4 to calculate the rotational angle φ of the rotor 13. Accordingly, as the rotation of the rotor 13 changes the rotational angle θ4 of the notch D4, which is arranged in the detection zone, in the range of 0°<θ4<24°, the controller 30 calculates the rotational angle φ of the rotor 13 as the same value as the rotational angle θ4 of the notch D4.

Figure 9C:
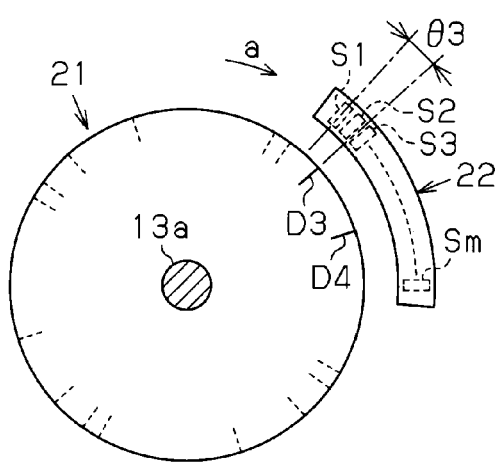

Then, further rotation of the rotor 13 in the direction indicated by the arrow a changes the rotational angle φ of the rotor 13 in the range of 24°≦φ<36°. As a result, the notches D3 and D4 become included in the detection zone of the rotation sensor 22 as shown in FIG. 9C. Since the angular interval between the notches D3 and D4 is 24°, the controller 30 sets the rotational angle correction value α to 24°. Then, the controller 30 adds the rotational angle correction value α to a rotational angle θ3 of the notch D3 to calculate the rotational angle φ of the rotor 13. Accordingly, as the rotation of the rotor 13 changes the rotational angle θ3 of the notch D3, which is arranged in the detection zone, in the range of 0°≦θ3<12°, the controller 30 calculates the rotational angle φ of the rotor 13 as a value in the range of 24°≦φ<36°.

Figure 9D:
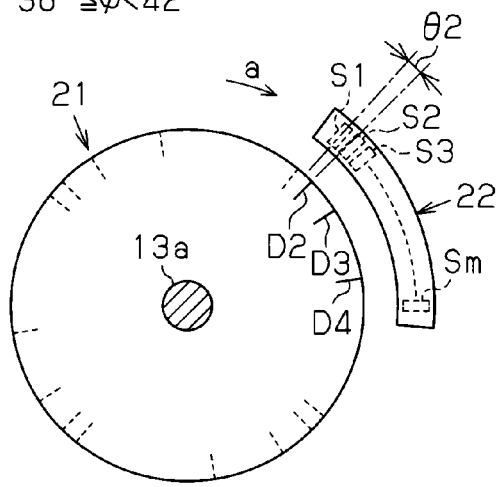

Further rotation of the rotor 13 in the direction indicated by the arrow a changes the rotational angle φ of the rotor 13 in the range of 36°≦φ<42°. As a result, the notches D2, D3, and D4 become included in the detection zone of the rotation sensor 22 as shown in FIG. 9D. In this case, the angular interval of 12° between the notches D2 and D3 is the shortest angular interval. Thus, the controller 30 sets the rotational angle correction value α to 36°. Then, the controller 30 adds the rotational angle correction value α to a rotational angle θ2 of the notch D2 to calculate the rotational angle φ of the rotor 13. Accordingly, as the rotation of the rotor 13 changes the rotational angle θ2 of the notch D2, which is arranged in the detection zone, in the range of 0°≦θ2<6°, the controller 30 calculates the rotational angle φ of the rotor 13 as a value in the range of 36°≦φ<42°.

Figure 10A:
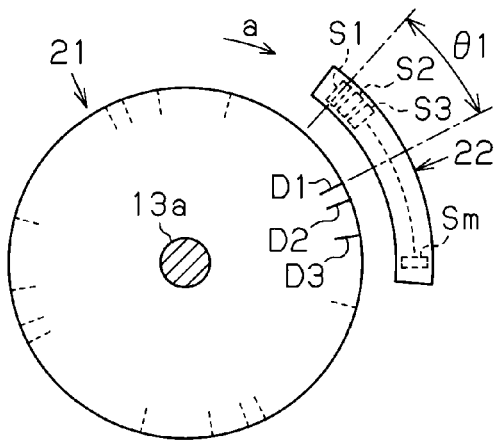
FIGS. 10A and 10B are schematic cross-sectional views showing examples of the rotor rotational angle calculated through the rotational angle detection process of FIG. 8.

Then, further rotation of the rotor 13 in the direction indicated by the arrow a changes the rotational angle φ of the rotor 13 in the range of 42°≦φ<84°. As a result, the notches D1, D2, and D3 become included in the detection zone of the rotation sensor 22 as shown in FIG. 10A. In this case, the angular interval of 6° between the notches D1 and D2 is the shortest angular interval. Thus, the controller 30 sets the rotational angle correction value α to 42°. Then, the controller 30 adds the rotational angle correction value α to a rotational angle θ1 of the notch D1 to calculate the rotational angle φ of the rotor 13. Accordingly, as the rotation of the rotor 13 changes the rotational angle θ1 of the notch D1, which is arranged in the detection zone, in the range of 0°≦θ1<42°, the controller 30 calculates the rotational angle φ of the rotor 13 as a value in the range of 42°≦φ<82°.

Figure 10B:
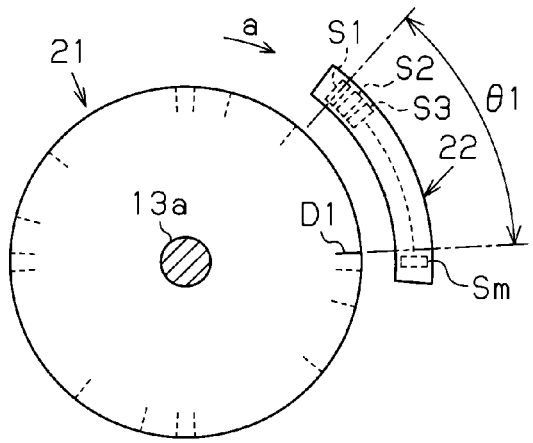
Figure 11:
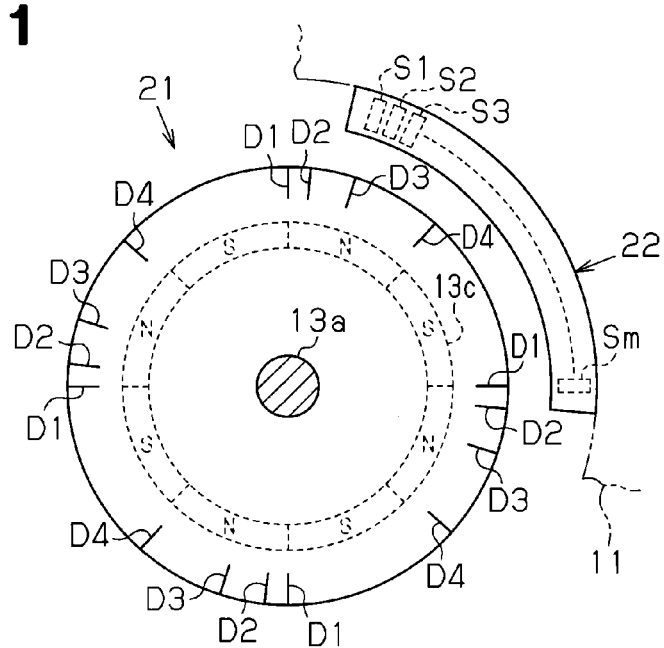
FIG. 11 is a schematic cross-sectional view showing a modification of the rotational angle detector of FIG. 2.

Afterwards, further rotation of the rotor 13 in the direction indicated by the arrow a changes the rotational angle φ of the rotor 13 in the range of 84°≦φ<90°. As a result, only the notch D1 becomes included in the detection zone of the rotation sensor 22 as shown in FIG. 10B. In this state, the controller 30 reads the rotational angle correction value α (42°) from the incorporated memory and adds the rotational angle correction value α to the rotational angle θ1 of the notch D1 to calculate the rotational angle φ of the rotor 13. Accordingly, as the rotation of the rotor 13 changes the rotational angle θ1 of the notch D1, which is arranged in the detection zone, in the range of 42°≦θ1<48°, the controller 30 calculates the rotational angle φ of the rotor 13 as a value in the range of 84°≦φ<90°.

In this manner, the rotational angle detector of the present embodiment accurately detects the rotational angle φ of the rotor 13 in the range of 0°≦φ<90°. Further, the rotary plate 21 is circular and thus does not rotate in an eccentric state when the rotor 13 rotates. This allows for accurate detection of the rotational angle of the notches D1 to D4 with the rotation sensor 22. Accordingly, the rotational angle φ of the rotor 13, or the magnetic pole position of the rotor 13, is detected with high accuracy.

The rotational angle detector of the present embodiment has the advantages described below.

(1) The rotary plate 21, which is formed integrally with the rotor 13, is circular. The rotary plate 21 has a circumferential surface including the plurality of notches D1 to D4, which are spaced apart from one another at different angular intervals in the circumferential direction. The rotation sensor 22 is arranged so as to extend along the circumferential direction of the rotary plate 21. The rotation sensor 22 detects the rotational angle θ of each of the notches D1 to D4, which rotate together with the rotary plate 21, in the predetermined detection zone. When adjacent ones of the notches D1 to D4 are located in the detection zone of the rotation sensor 22, the rotational angle detector determines the angular interval between the adjacent notches based on the rotational angle θ of each notch detected by the rotation sensor 22. Further, the rotational angle detector specifies the ones of the notches D1 to D4 that are located in the detection zone based on the determined angular interval. Then, the rotational angle detector detects the rotational angle φ of the rotor 13 based on the rotational angle of a specified notch rotated in the detection zone. This method detects the rotational angle φ of the rotor 13, or the magnetic pole position of the rotor 13, with high accuracy.

(2) The notches D1 to D4 form a predetermined layout pattern, or mark pattern, in the circumferential direction of the rotary plate 21. The mark pattern is repeatedly arranged in the circumferential direction of the rotary plate 21. The number of the repeatedly arranged mark patterns is set based on the number of magnetic poles in the rotor 13. This structure facilitates the formation of the marks used to detect positions.

(3) The quantity of mark patterns, each formed by the notches D1 to D4, is set to be one half the quantity of the magnetic poles in the rotor 13. In this structure, a single mark pattern is arranged in the angular zone in which a pair of magnetic poles (N pole and S pole) of the rotor 13 is arranged. Thus, the rotational angle φ of the rotor 13 is detected with high accuracy.

(4) The detection zone of the rotation sensor 22 includes a predetermined detection range in the circumferential direction of the rotary plate 21. The detection range is set to conform to the range of the two adjacent ones of the notches D1 to D4 that are spaced apart by the longest angular interval. This structure allows for the rotation sensor 22 to be reduced in size while ensuring that it has the necessary detection function.

(5) The rotation sensor 22 includes the plurality of eddy current flaw sensors S1 to Sm, which are arranged in an arced manner along the circumferential surface of the rotary plate 21 in correspondence with the detection zone of the rotation sensor 22. The sensors S1 to Sm each detect the approach of one of the notches D1 to D4. This structure facilitates the detection of the rotational angle of each notch D. Further, the machining of the rotary plate 21 is simplified as compared to when using a proximity sensor of which detection subject is, for example, a projection.

(6) The rotational angle detector sets the rotational angle correction value α in accordance with the position of the notch D specified in the detection zone of the rotation sensor 22. Then, the rotational angle detector corrects the rotational angle of the specified notch D with the rotational angle correction value α to detect the rotational angle of the rotor 13. This structure directly sets the rotational angle correction value α in accordance with the locations of the notches D arranged on the circumferential surface of the rotary plate 21. Accordingly, the rotational angle of the rotor 13 is easily calculated just by correcting the rotational angle of a notch D rotating in the detection zone with the rotational angle correction value α.

It should be apparent to those skilled in the art that the present invention may be embodied in many other specific forms without departing from the spirit or scope of the invention. Particularly, it should be understood that the present invention may be embodied in the following forms.

In the above-discussed embodiment, the detection zone of the rotation sensor 22 has a range set to be the same as the longest angular interval of notches D1 to D4, which is 48°. Instead, the range of the detection zone of the rotation sensor 22 may be set to a value obtained by adding the angular interval between the notches D3 and D4 to the angular interval between the notches D4 and D1, namely, 72°. In this structure, two or more notches are always present in the detection zone of the rotation sensor 22. Thus, steps S2, S6, and S8 may be eliminated from the rotor rotational angle detection process of FIG. 8. This reduces the processing load on the controller 30.

In the above-discussed embodiment, the angular intervals of the notches are calculated from the rotational angle θ detected by the rotation sensor 22. The notches located in the detection zone are determined based on the shortest one of the angular intervals. The rotational angle φ of the rotor 13 is calculated from the rotational angle of the notches determined to be located in the detection zone. Instead, for example, the notches located in the detection zone may be determined based on the longest one of the angular intervals. Further, the rotational angle φ of the rotor 13 may be calculated based on the rotational angle of a notch determined to be in the detection zone and the rotational angular correction value α corresponding to that notch.

In the above-discussed embodiment, the rotational angular detector according to the present invention is applied to a brushless motor having a rotor with eight magnetic poles. However, the rotational angle detector is also applicable to a brushless motor including two poles, four poles, or ten or more poles. When the rotor 13 has a number of poles that is expressed by 2n (where n is an integer of 1 or greater), the number of repeated layout patterns of the notches D1 to D4 may be set to n to detect the positions of the magnetic pole positions in the rotor 13. Here, the angular intervals of the notches D1 to D4 must be varied in accordance with the repeated number of layout patterns.

In the above-discussed embodiment, the angular intervals of the notches D1 to D4 are set in the ratio of 1:2:4:8 but may be set in the ratio of, for example, 1:2:4:6 or 8:2:4:1. An effective way to calculate the rotational angle of the rotor 13 when the angular intervals of the notches D1 to D4 are set in the ratio of 8:2:4:1 is as follows. The angular intervals of the notches are calculated based on the rotational angle θ of the notches detected by the rotation sensor 22. Further, the notches located in the detection zone are determined based on the shortest one or the longest one of the angular intervals. Then, the rotational angle φ of the rotor 13 is calculated based on the rotational angle of a notch determined as being located in the detection zone and the rotational angle correction value α for the notch. It is just required that a plurality of notches be arranged at different angular intervals on the circumferential surface of the rotary plate 21.

The notches D1 to D4 are each provided in a quantity of four. Instead, the notches D1 to D4 may each be provided in a quantity of three or in a quantity of five or more.

In the above-discussed embodiment, the rotation sensor 22, which serves as the rotational angle detection unit, is formed by the plurality of notches D1 to D4 and the eddy current flaw sensors S1 to Sm. The notches D1 to D4 are arranged as position detection marks on the circumferential surface of the rotary plate 21. The eddy current flaw sensors S1 to Sm detect the approach of the notches D1 to D4. Instead, the rotation sensor 22 may be formed by, for example, a plurality of hall sensors or MR sensors, which detect the notches D1 to D4. The rotation sensor 22 may also be formed by projections, which are arranged on the outer circumferential surface of the rotary plate 21, and proximity sensors, which detect the approach of the projections.

The present examples and embodiments are to be considered as illustrative and not restrictive, and the invention is not to be limited to the details given herein, but may be modified within the scope and equivalence of the appended claims.

What is claimed is:

1. A rotational angle detector for detecting a rotational angle of a rotor arranged in a motor, the rotational angle detector comprising:

a circular rotary plate integrally rotatable with the rotor and including a circumferential surface having a plurality of marks spaced apart from one another by different angular intervals in a circumferential direction; and a rotational angle detection unit arranged along the circumferential direction of the rotary plate to detect a rotational angle of each of the plurality of marks, which are rotated together with the rotary plate, in a predetermined detection zone;

wherein the rotational angle detector determines, when adjacent ones of the plurality of marks are located in the predetermined detection zone, angular intervals between the adjacent ones of the marks based on the rotational angle of each mark detected by the rotational angle detection unit, specifies from the plurality of marks a mark that is located in the predetermined detection zone based on the determined angular intervals, and detects the rotational angle of the rotor based on the rotational angle of the specified mark rotating in the predetermined detection zone.

2. The rotary angle detector according to claim 1, wherein the rotor includes a plurality of magnetic poles; and the plurality of marks form predetermined mark patterns in the circumferential direction of the rotary plate, and the mark patterns are repeatedly arranged in the circumferential direction of the rotary plate, with the number of the repeatedly arranged mark patterns being set based on the number of magnetic poles of the rotor.

3. The rotational angle detector according to claim 2, wherein the number of magnetic poles of the rotor is expressed by 2n, where n is an integer of 1 or greater, and the number of repeatedly arranged mask patterns is expressed by n.

4. The rotational angle detector according to claim 1, wherein the predetermined detection zone has a predetermined detection range extending along the circumferential direction of the rotary plate, and the detection range is set to be the same as a range of the angular interval between two adjacent ones of the marks that are spaced apart by the longest angular interval.

5. The rotational angle detector according to claim 1, wherein the rotation detection unit includes a plurality of proximity sensors arranged in an arced manner in correspondence with the predetermined detection zone along the circumferential direction of the rotary plate, and each of the plurality of proximity sensors detects an approach of one of the plurality of marks.

6. The rotational angle detector according to claim 5, wherein the rotary plate is formed from a conductive material, and the plurality of marks are each formed by a recessed notch; and the plurality of proximity sensors are each an eddy current flaw sensor including an excitation coil, which forms an alternating magnetic field on the circumferential surface of the rotary plate to generate eddy current on the circumferential surface, and a detection coil, which detects a change in the magnetic field caused by the eddy current generated on the circumferential surface of the rotary plate, wherein the eddy current flaw sensor detects the approach of one of the plurality of marks when the magnetic field detected by the detection coil changes.

7. The rotational angle detector according to claim 1, wherein the rotational angle detector sets a rotational angle correction value in accordance with a position of the specified mark in the predetermined detection one and corrects the rotational angle of the specified mark with the rotational angle correction value to calculate the rotational angle of the rotor.

8. A method for detecting a rotational angle of a rotor arranged in a motor, the method comprising:

detecting a rotational angle of each of a plurality of marks, which are formed on a circular rotary plate, in a predetermined detection zone, the rotary plate being integrally rotatable with the rotor, and the plurality of marks being spaced apart from one another by different angular intervals in a circumferential direction of the rotary plate;

determining, when adjacent ones of the plurality of marks are located in the predetermined detection zone, angular intervals between the adjacent ones of the marks based on the rotational angle of each mark;

specifying from the plurality of marks a mark that is located in the predetermined detection zone based on the determined angular intervals; and detecting the rotational angle of the rotor based on the rotational angle of the specified mark rotating in the predetermined detection zone.

* * * * *